United States Patent [19]

Turnpaugh

[11] Patent Number: 4,705,970
[45] Date of Patent: Nov. 10, 1987

[54] PROGRAMMABLE INTERVAL TIMER WITH LOCK MEANS

[75] Inventor: George F. Turnpaugh, Naperville, Ill.

[73] Assignee: American Telephone and Telegraph Company, AT&T Bell Laboratories, Murray Hill, N.J.

[21] Appl. No.: 697,880

[22] Filed: Feb. 4, 1985

[51] Int. Cl.$^4$ ...................... H03K 5/19; H03M 13/00
[52] U.S. Cl. .................................... 307/600; 307/517; 371/62
[58] Field of Search ............... 307/517, 518, 362, 600; 328/109–110; 377/84; 371/62

[56] References Cited

U.S. PATENT DOCUMENTS

| | | | |
|---|---|---|---|
| 4,083,366 | 4/1978 | Gombrich et al. | 128/706 |
| 4,161,787 | 7/1979 | Groves et al. | 364/900 |
| 4,171,471 | 10/1979 | Boyles | 200/38 D |
| 4,438,402 | 3/1984 | Cullen et al. | 324/452 |
| 4,455,661 | 6/1984 | Qureshi | 375/8 |
| 4,524,291 | 6/1985 | Lehning | 307/517 |
| 4,531,223 | 7/1985 | Ashida | 307/517 |

Primary Examiner—Stanley D. Miller
Assistant Examiner—B. P. Davis
Attorney, Agent, or Firm—Richard J. Godlewski

[57] ABSTRACT

A programmable interval timer (100) for generating an error signal when a timing signal is received outside a predetermined time frame. The timer includes a timer circuit (104) having programmable minimum and maximum timing intervals for determining the predetermined time frame. These timing intervals are programmed into the timer circuit in response to data input signals indicative of the timing intervals from, for example, a microprocessor. The timer circuit generates one output signal when the time interval between two consecutively received timing signals is less than the minimum timing interval. Another output signal is generated when the time interval is greater than the maximum timing interval. An error signal latch generates the error signal when it receives either one of the two timer circuit output signals. Also included is a lock circuit (102) for preventing the timer circuit from responding to any data input signals after the first timing signal is received. Lastly, an indicator latch (103) is also provided to indicate to, for example, a central processing unit that an error signal has been sent to the microprocessor. A reset signal from the central processing unit resets the indicator latch and unlocks the lock circuit to reprogram the minimum and maximum timing intervals.

12 Claims, 3 Drawing Figures

── 4,705,970 ──

PROGRAMMABLE INTERVAL TIMER WITH LOCK MEANS

TECHNICAL FIELD

This invention relates generally to programmable interval timers and, more particularly, to a programmable interval timer for generating an error signal when a timing signal is received outside a predetermined time frame.

BACKGROUND OF THE INVENTION

In the past, programmable interval timers have been used to perform a variety of timing functions in various electrical systems. As described in U.S. Pat. No. 4,171,471, one use of a programmable interval timer in a home security system is to control the operation of electrical devices such as automatically turning the devices on and off at designated times during the day. The timer is manually programmed by sliding adjustable contacts positioned on the circumference of a rotating timing dial. In more sophisticated security systems, a microprocessor typically programs the timing intervals and controls the timer.

In one system to measure the length of a moving elongated material surface as described in U.S. Pat. No. 4,438,402, the output pulses of a rolling contact tachometer length gauge are used to program two counters of a programmable interval timer. The timing intervals of these two counters form a time window in which a measurement signal from a highly accurate, but somewhat unreliable, electrostatic length gauge is expected. The output of the electrostatic length gauge is used to correct the less accurate, but more reliable, tachometer gauge output pulses. If the measurement signal is not sensed within this time window, the output pulses from the tachometer gauge automatically restart the unreliable electrostatic gauge. However, output signals from the electrostatic gauge outside the time window are disregarded.

In another prior art system described in U.S. Pat. No. 4,161,787, a programmable interval timer is coupled to the data bus of a microprocessor system to generate an interrupt signal when a maximum predetermined count has been reached. The timer has several counters that may be individually set by various software routines to different maximum timing intervals.

In still another prior art dual processor system described in U.S. Pat. No. 4,455,661, a programmable interval timer serves as a "watchdog" or "sanity" timer. One of the processors programs a maximum timing interval into the timer. At the start of a processor program routine, the programmable timer initiates the timing interval. Each program routine includes instructions to periodically reset the timer. Should the processor be under the control of an endless program loop, the maximum timing interval of the timer is exceeded, and the timer generates an alarm signal to interrupt the endless program loop. However, such an arrangement fails to address the problem of a processor under the control of an endless program loop that continually resets the timer. No matter how long the processor is under the control of this endless loop, the sanity timer will not interrupt the processor. In addition, since the timer is programmable, a processor under the control of an endless program loop may somehow reprogram the timing interval of the timer. Thus, the programmable timer may be again rendered useless to interrupt the processor.

SUMMARY OF THE INVENTION

The problems of the aforementioned programmable interval timers are solved and a technical advance is achieved by a programmable interval timer for generating an error signal when a timing signal is received outside a predetermined time frame. The programmable interval timer includes a timer circuit that has minimum and maximum timing intervals. These intervals are set in response to data input signals from, for example, a microprocessor and determine the predetermined time frame. The timer circuit generates one output signal when the time interval between two timing signals is less than the minimum timing interval. Similarly, the timer circuit generates another output signal when the time interval between the timing signals is greater than the maximum timing interval. When the second timing signal is received outside this time frame, one of two output signals is generated depending on whether the timing signal is received before or after the time frame. Also included in the programmable interval timer is an error signal latch that is responsive to either of the two output signals for generating the error signal.

In accordance with one feature of the invention, a lock circuit is also included to prevent the timer circuit from responding to any data input signals changing the minimum or maximum timing intervals after the first timing signal is received.

In accordance with another aspect of this invention, a lock circuit may be combined with a timer circuit having only one programmable timing interval to prevent the timer circuit from responding to any other data input signals to change the timing interval after the first timing signal is received.

In accordance with another feature of this invention, an indicator latch may also be included in the programmable interval timer to indicate that an error signal has been generated until the indicator latch is reinitialized in response to a reset signal received from, for example, a central processing unit.

BRIEF DESCRIPTION OF THE DRAWING

The invention may be better understood from the following detailed description when read with reference to the drawings in which.

DETAILED DESCRIPTION

Figure 1:
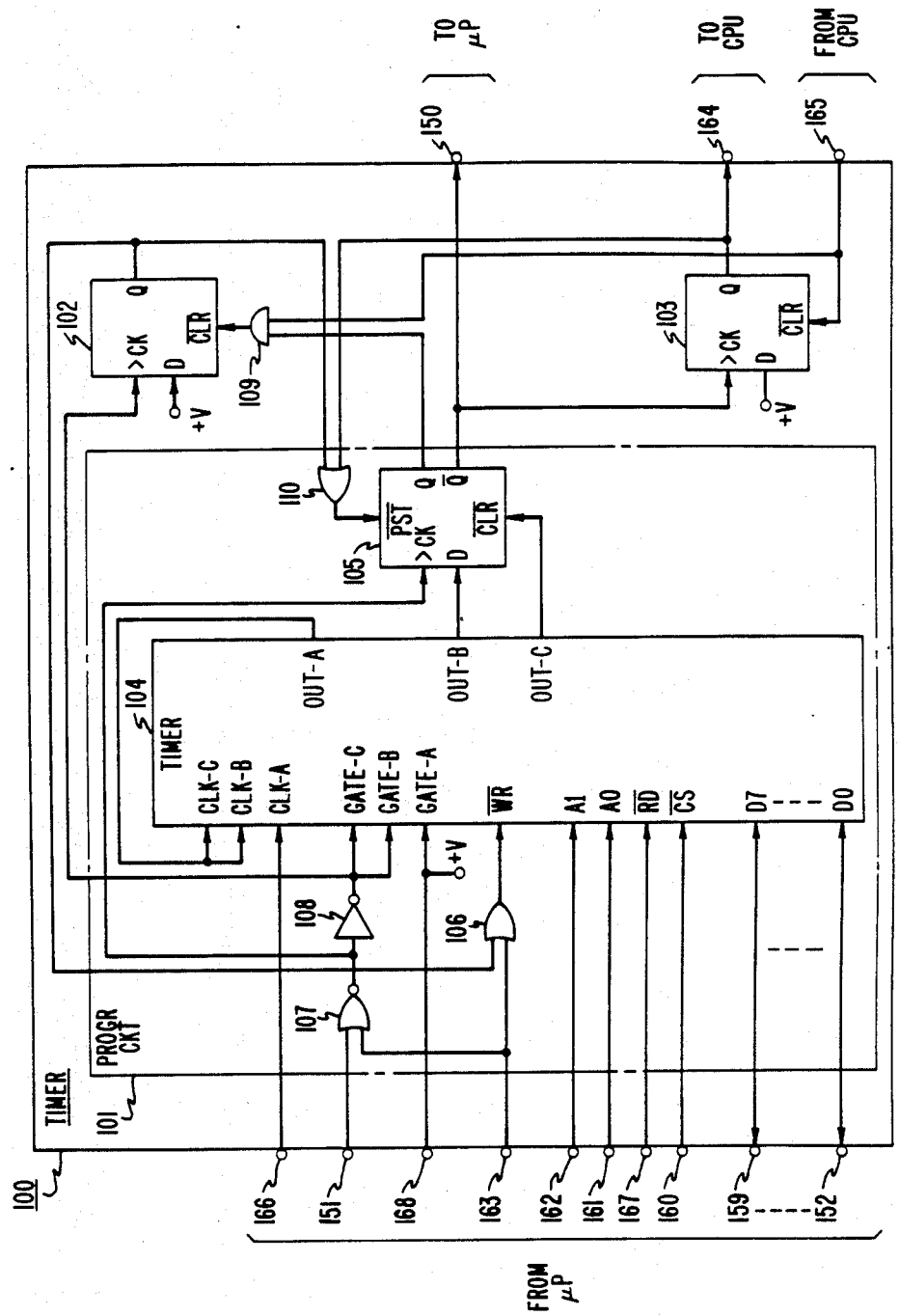
FIG. 1 depicts a block diagram of an illustrative programmable interval timer for generating an error signal when the timing interval between consecutively received timing signals is either less than a minimum timing interval or greater than a maximum timing interval.

Depicted in FIG. 1 is a block diagram of an illustrative lockable, programmable interval timer 100 comprising programmable timing interval circuit 101 and lock circuit 102 for generating an error signal when a timing signal is received outside a predetermined time frame. The predetermined time frame is the difference between a minimum and a maximum timing interval that are programmed into programmable timing interval circuit 101. By way of example, timer 100 may be used as a sanity timer in a microprocessor-controlled peripheral unit of a telecommunications system such as the 1A ESS ™ switch which is well known and commercially available from AT&T Technologies, Inc. The timer may also be used with any other time-dependent processing equipment such as a data processor and the like. As a sanity timer, timer 100 generates the error signal on output terminal 150 to interrupt the peripheral unit microprocessor (not shown) when a timing signal is applied to input terminals 151 and 163 outside the predetermined time frame. The beginning of this time frame is the end of a minimum timing interval, and the end of the frame is the end of a maximum timing interval. Each timing signal simultaneously initiates the minimum and maximum timing intervals for the next timing signal. Using only a one timing interval timer, each timing signal would initiate the predetermined time frame for the next timing signal.

With lock circuit 102 in an unlocked (reset) state, the peripheral unit microprocessor programs the minimum and maximum timing intervals into programmable timing interval circuit 101 before any timing signals are sent to the timer. First, the microprocessor selects timer 100 by applying a timer select signal to input 160 and addresses a minimum timing interval in programmable timing interval circuit 101 by applying a set of address signals to input terminals 161 and 162. Next, the microprocessor sends the minimum timing interval to the addressed minimum timing interval counter by applying a data input signal indicative of the minimum timing interval to input/output terminals 152-159. Lastly, the microprocessor writes the minimum timing interval into the addressed minimum timing interval counter by applying a write signal to input terminal 163. In a similar manner, the microprocessor programs the maximum timing interval into a maximum timing interval counter of programmable circuit 101. The microprocessor can also read the programmed minimum and maximum timing intervals from programmable circuit 101 at any time by addressing the desired counter, applying a read signal to input terminal 167, and receiving the programmed timing interval on input/output terminals 152-159.

The first timing signal from the microprocessor applied to input terminals 151 and 163 causes lock circuit 102 to assume a locked (set) state. When in a locked state, lock circuit 102 prevents programmable circuit 101 from responding to any subsequently received data input signals on input/output terminals 152-159. This prevents the microprocessor from trying to reprogram the timer, particularly, after a microprocessor error condition has been detected.

Also included in timer 100 is indicator latch 103 for storing the error signal. The stored error signal is applied to output terminal 164 for indicating to the central processing unit (not shown) of the telecommunication system that an error signal has been sent to interrupt the peripheral unit microprocessor. The stored error signal remains in indicator latch 103 until a reset signal from the central processing unit applied to input terminal 165 reinitializes the latch.

Programmable timing interval circuit 101 comprises a programmable interval timer circuit 104 and error signal latch 105 for generating the error signal on output terminal 150 when a timing signal is received outside the time frame defined by the programmed minimum and maximum timing intervals. All of the components of programmable timing interval circuit 101, as well as all of the other components of timer 100, are well-known and commercially available components. Timer circuit 104 such as the 8254 programmable interval timer from the Intel Corporation is interconnected with D-type flip-flop error signal latch 105 and logic gates 106-108 as shown in FIG. 1 to program the timer circuit and to generate the error signal. All of the input and output terminals of timer 104 have been designated to match the designated input and output terminals of the 8254 programmable interval timer as indicated by the manufacturer. The reader is referred to various publications from the Intel Corporation such as the "8254 Programmable Interval Timer", November, 1981, for a detailed description of the 8254 programmable interval timer.

Figure 2:
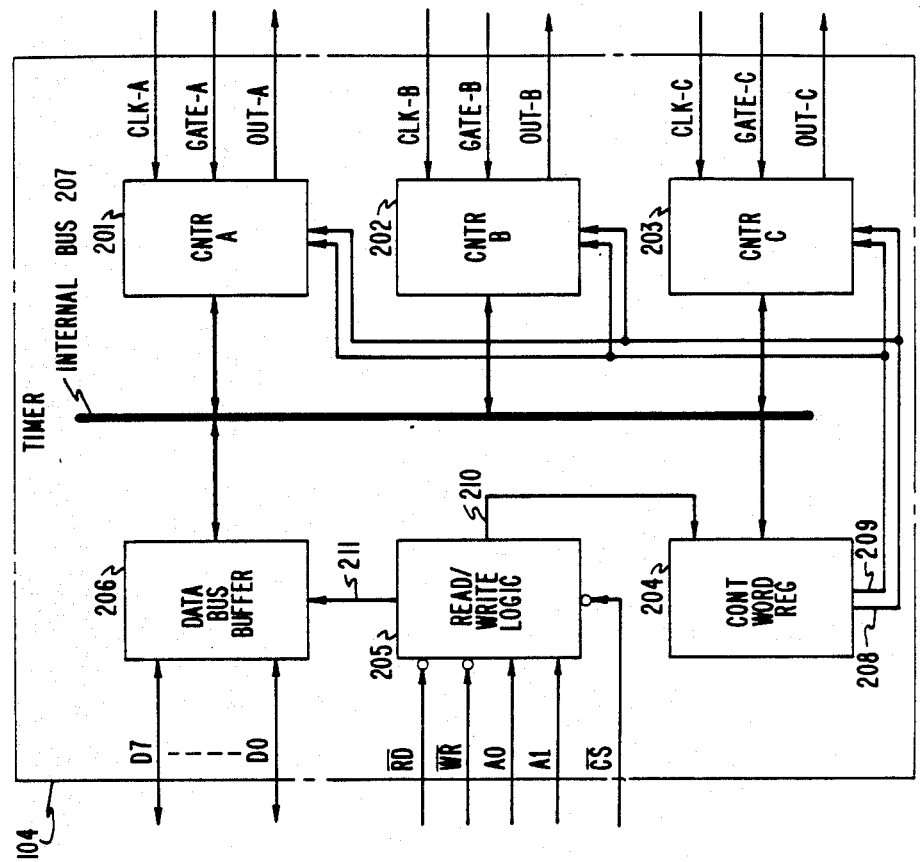
FIG. 2 shows a block diagram of the timer circuit of the programmable interval timer of FIG. 1.

An illustrative timer circuit 104 is shown in the block diagram of FIG. 2. Timer circuit 104 comprises counters 201-203, control word register 204, read/write logic 205, and data bus buffer 206 interconnected as shown by internal bus 207 and control leads 208-211. Data bus buffer 206 buffers the data input signals between the microprocessor and timer 104. These data input signals are binary representations of the minimum and maximum timing intervals that are stored in counters 202 and 203 respectively. Read/write logic 205 receives input signals from the microprocessor on input terminals $\overline{RD}$, $\overline{WR}$, A0, A1, and $\overline{CS}$ and generates control signals to control word register 204 via conductor 210 and to data bus buffer 206 via conductor 211. Address signals from the microprocessor that are applied to input terminals A0 and A1 cause read/write logic 205 to select one of counters 201-203 or control word register 204 to be read from or written into. An active logic level signal on input terminal $\overline{RD}$ indicates that the microprocessor is reading one of counters 201-203 or control word register 204. An active logic level signal from the microprocessor on input terminal $\overline{WR}$ indicates that the microprocessor is writing either a timing interval count into one of counters 201-203 or a control word into control register 204. Active logic level signals on input terminals $\overline{RD}$ and $\overline{WR}$ are ignored unless timer 104 has been selected by maintaining an active logic level signal on input terminal $\overline{CS}$.

Counters 201-203 are identical in operation. The counters are fully independent, and each counter may operate in a different mode. Counter 201 operates in a rate generator mode and functions like a divide-by-N counter. Counter 202 operates in a hardware retriggerable one-shot mode, and counter 203 operates in a hardware triggered strobe (retriggerable) mode. Each counter is controlled by control word register 204. The contents of the control word register determines how each counter operates.

Figure 3:
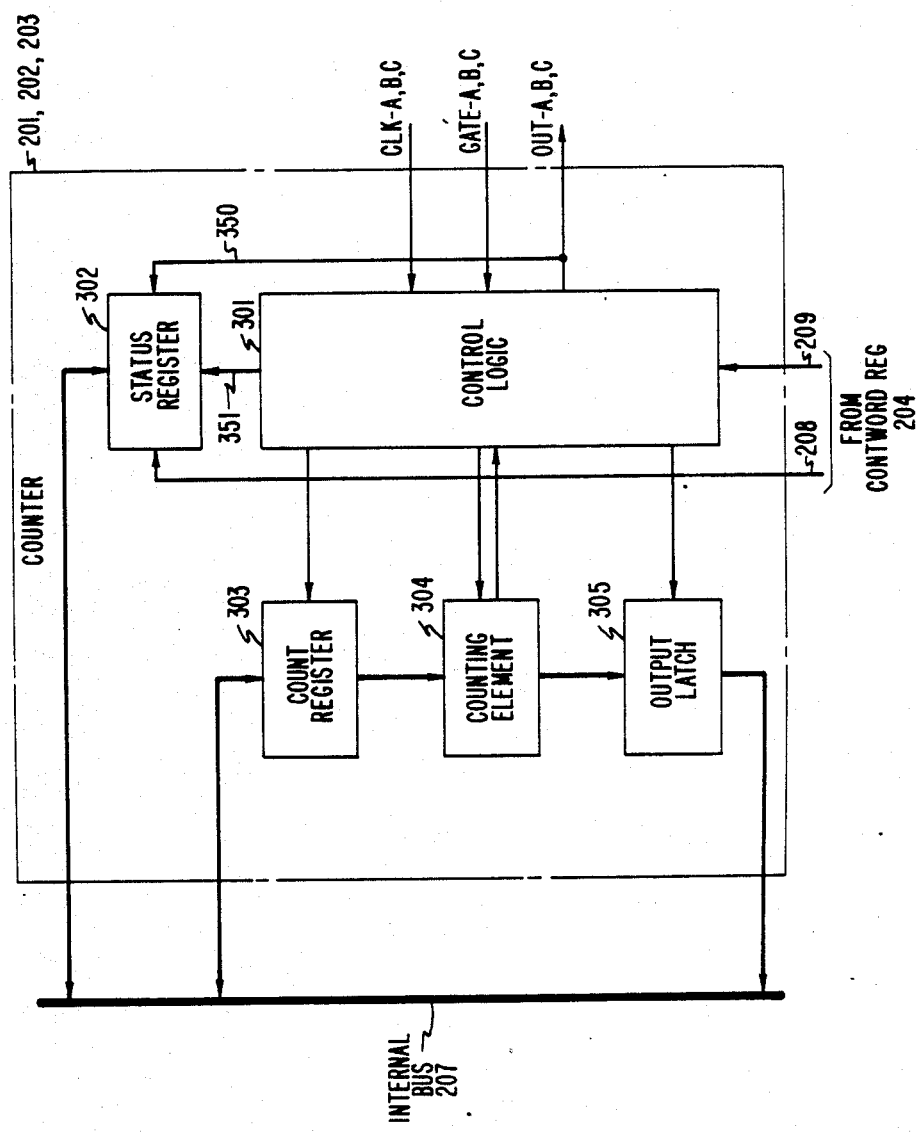
FIG. 3 shows a block diagram of the counter circuits of the timer circuit of FIG. 2.

A block diagram of counters 201-203 is shown in FIG. 3. Each counter comprises control logic 301, status register 302, count register 303, counting element 304, and output latch 305 interconnected as shown. Counting element 304 is a presettable synchronous down counter and is controlled by control logic 301. Count register 303 contains a count that is received from internal bus 207 under the control of control word register 204 and control logic 301. For counter 202, the count in count register 303 is indicative of the minimum timing interval. For counter 203, the count contained in count register 303 is indicative of the maximum timing interval. And for counter 201, the count in counter register 303 is used to generate a clock signal for counters 202 and 203 that has a bit rate slower than the clock signal from the microprocessor on sanity timer 100 input terminal 166 and corresponding timer 104 input terminal CLK-A. The bit rate of the clock signals applied to counters 202 and 203 and the counts contained therein determine the length of the minimum and maximum timing intervals, respectively.

Control logic 301 interfaces the output, timing, and clock signals between terminals CLK-n, GATE-n, and OUT-n and counting element 304. The variable n equals A, B, or C for counters 201, 202, and 203, respectively. The control logic also controls status register 302, count register 303, and output latch 305 in response to control signals from control word register 204 on conductor 209.

Status register 302 contains the present contents of control word register 204 received via conductor 208 and the level of the signal on output terminal OUT-n received via conductor 350. In addition, status register 302 stores other information contained in control logic 301 received via conductor 351. At the beginning of each timing interval initiated by a timing signal being applied to input terminal GATE-n, the count in count register 303 is gated into counting element 304. The count in counting element 304 is decremented each time a clock pulse is applied to input terminal CLK-n until the count reaches zero. When the count reaches zero, counting element 304 generates an output signal on output terminal OUT-n via control logic 301. The count in counting element 304 is also repeatedly gated to output latch 305. However, under the control of control logic 301 a particular count may be latched into the output latch and stored until read by the central processing unit.

Briefly describing the operation of minimum timing interval counter 202, the minimum timing interval count that is indicated by the data input signals from the microprocessor applied to input terminals 152–159 and corresponding timer 104 input terminals D0–D7 is written into count register 303. Each time a timing signal from the microprocessor is applied to input terminal GATE-B, the minimum timing interval count is gated into counting element 304. This count is decremented each time a clock signal from the microprocessor is applied to input terminal CLK-B until the count in counting element 304 reaches zero. When the count in counting element 304 normally reaches zero before the receipt of the next timing signal from the microprocessor, the output signal on output terminal OUT-B assumes a high logic level. However, when the next timing signal is received before the count in counting element 304 decrements to zero, the output signal on output terminal OUT-B remains a low logic level indicative of an error condition. In addition, each timing signal causes control logic 301 to regate the minimum timing level count from count register 303 into counting element 304 to restart the minimum timing interval for the next timing signal from the microprocessor.

In a similar manner, a data input signal indicative of the maximum timing interval is written into count register 303 of maximum timing interval counter 203 for generating a low logic level output signal on output terminal OUT-C when the time interval between two timing signals from the microprocessor exceeds the maximum timing interval. However, in this case, a high logic level on output terminal OUT-C indicates that the count in counting element 304 is still being decremented. A low logic level signal on output terminal OUT-C indicates that the count in counting element 304 has decremented to zero and that the timing interval between two timing signals has exceeded the maximum timing interval.

With respect to rate generator counter 201, a data input signal indicative of a count that will cause counter 201 to change the bit rate of the clock signal received from the microprocessor on input terminal CLK-A to a slower bit rate clock signal for counters 202 and 203 is written in count register 303. This new bit rate clock signal applied to input terminals CLK-B and CLK-C of counters 202 and 203 along with the minimum and maximum timing interval counts contained therein is used to establish the minimum and maximum timing intervals. A low logic level signal may be applied to input terminal GATE-A to inhibit the operation of counter 201.

Returning the reader's attention to FIG. 1, programmable timing interval circuit 101 comprises timer circuit 104 and error signal latch 105 interconnected as shown with logic gates 106–108. In particular, data input signals from the microprocessor are applied to timer circuit 104 input terminals D0–D7 via input terminals 152–159, respectively. Timer select, read, address bit zero, address bit one, timer inhibit, and clock signals from the microprocessor are directly applied to timer circuit 104 input terminals $\overline{CS}$, $\overline{RD}$, A0, A1, GATE-A, and CLK-A via corresponding input terminals 160, 167, 161, 162, 168, and 166, respectively. Write and timing signals from the microprocessor are applied to timer circuit input terminals $\overline{WR}$, GATE-B, and GATE-C via logic OR gate 106, logic NOR gate 107, and inverter 108 as shown. The maximum and minimum timing intervals can only be programmed into timer 104 when a data input signal and an active write signal from the microprocessor are simultaneously applied to data input terminals D0–D7 and write input terminal $\overline{WR}$, respectively. An active low logic level write signal can be applied to input terminal $\overline{WR}$ only when a low logic level signal is simultaneously applied to each input terminal of logic OR gate 106. One input terminal of gate 106 is connected to the microprocessor via input terminal 163, whereas the other input terminal is connected to output terminal Q of lock circuit 102. Thus, lock circuit 102 prevents timer 104 from responding to any data input signals by applying a high logic level signal to logic OR gate 106. Since counters 202 and 203 only respond to a low to high logic level signal transition on input terminals GATE-B and GATE-C, a timing signal from the microprocessor consists of a low logic level signal applied to one input terminal of NOR gate 107 via input terminal 151 and the transition from a low to a high logic level on the other input terminal of NOR gate 107 via input terminal 163. The output signal of NOR gate 107 is applied to inverter 108 and to clock input terminal CK of D-type flip-flop latch 105. The logic level signal on input terminal D of latch 105 is clocked into the latch when there is a low to high logic level signal transition on input terminal CK. This occurs when the write input signal from the microprocessor initially changes from a high to a low logic level and causes a corresponding low to high logic level signal transition on the output terminal of NOR gate 107. Furthermore, the logic level of the NOR gate 107 output signal is inverted by inverter 108 and applied simultaneously to input terminals GATE-B and GATE-C of counters 202 and 203, respectively. Again, a signal transition from a low to high logic level on input terminals GATE-B and GATE-C constitutes a timing signal that gates counters 202 and 203.

The bit rate of the clock signal from the microprocessor is changed by rate generator counter 201 to a slower bit rate on output terminal OUT-A and applied to input terminals CLK-B and CLK-C of counters 202 and 203. This slower bit rate clock signal and the counts in counters 202 and 203 determine the minimum and maximum timing intervals. The output signal from counter 202 on output terminal OUT-B indicates whether the time interval between successive timing signals from the microprocessor has exceeded the minimum timing interval. When this time interval is less than the minimum timing interval, counter 202 applies a low logic level signal indicative of an error condition to input terminal D of error signal latch 105. This low logic level signal is clocked into the latch at the beginning of the microprocessor timing signal when a low to high logic level signal transition is applied to input terminal CK of the latch. When the minimum timing interval has been exceeded, a high logic level signal is applied to input terminal D.

Similarly, the output signal from maximum timing interval counter 203 on output terminal OUT-C indicates whether the time interval between two consecutive timing signals has exceeded the maximum timing interval. When the maximum timing interval normally has not been exceeded, a high logic level is applied to input terminal $\overline{CLR}$ of latch 105. Since the latch has been preset, this high logic level does not change the contents of latch 105. However, when the maximum timing interval has been exceeded, a low logic level signal indicative of an error condition is applied to input terminal $\overline{CLR}$. In this case, latch 105 is reset, and the contents assumes a low logic level.

The contents of latch 105 appears on output terminal Q with the inverse logic level appearing on output terminal $\overline{Q}$. Accordingly, when either the minimum timing interval has not been reached or the maximum timing interval has been exceeded, a high logic level error signal indicative of an error condition is present on output terminal $\overline{Q}$ of the latch. This high logic level error signal interrupts the microprocessor which, in turn, will typically call a fault recovery routine. The inverse low logic level signal on output terminal Q of latch 105, which is applied to input terminal $\overline{CLR}$ of lock circuit 102 via logic AND gate 109, unlocks (resets) the lock circuit for the interrupted microprocessor to reprogram the timing intervals.

The transition of the error signal on output terminal $\overline{Q}$ from a low to high logic level also clocks a high logic level signal into indicator latch 103. This is accomplished by applying a high logic level voltage (+V) as shown to input terminal D of indicator latch 103 and connecting output terminal $\overline{Q}$ of error signal latch 105 to input terminal CK of indicator latch 103. Thus, a high logic level error signal is stored in indicator latch 103 and is present on output terminal Q of the latch as an indication to the central processing unit that an interrupt signal has been sent to the microprocessor.

After the interrupted microprocessor has recovered, the central processing unit resets indicator latch 103 and lock circuit latch 102 by applying a low logic level reset signal to input terminal $\overline{CLR}$ of the two latches. As shown, this reset signal is applied through logic AND gate 109 to input terminal $\overline{CLR}$ of lock circuit latch 102.

After being reset, D-type flip-flop lock circuit latch 102 applies a low logic level input signal to logic OR gate 106 via output terminal Q. This allows the microprocessor to reprogram the minimum and maximum timing intervals into timer 104. Since input terminal D of the lock circuit is connected to a high logic level voltage (+V), the low to high logic level transition of the first timing signal from the microprocessor applied to input terminal CK of the lock circuit via inverter 108 clocks and sets the latch. This prevents timer 104 from responding to a write signal from the microprocessor by applying a high logic level signal to one input terminal of logic OR gate 106. The contents of reset lock circuit 102 and indicator latch 103 are applied to input terminal $\overline{PST}$ of error signal latch 105 via logic OR gate 110 to set latch 105. When set, the contents of latch 105 is applied to logic AND gate 109.

Briefly summarizing, before any timing signals from the microprocessor are applied to sanity timer 100, the microprocessor programs the sanity timer by applying data input signals indicative of maximum and minimum timing intervals to input terminals 152–159. These intervals are written into minimum and maximum timing interval counters 202 and 203 by the microprocessor selecting timer 100, addressing the corresponding counter, and writing the time interval into the corresponding counter. After the first timing signal from the microprocessor is received, lock circuit 102 prevents the timer from responding to any other data input signals. Upon the receipt of each timing signal, timer 104 initiates the minimum and maximum timing intervals and measures the time interval to the next timing signal.

When the minimum timing interval is not reached, timer 104 generates a low logic level error signal on input terminal D of error signal latch 105. When clocked, latch 105 is reset, and an error signal is generated on output terminal $\overline{Q}$. Similarly, when the time interval between the two timing signals exceeds the maximum timing interval, timer 104 generates a low logic error level output signal on input terminal $\overline{CLR}$ of latch 105. This resets latch 105 causing a high logic level error signal on output terminal $\overline{Q}$. This high logic level error signal interrupts the microprocessor to call in a fault recovery routine.

A high logic level error output signal is also stored in indicator latch 103 to signal the central processing unit that a microprocessor interrupt has occurred. After the interrupted microprocessor has recovered, the central processing unit resets indicator latch 103 and lock circuit 102. This permits the microprocessor to once again program timer 104 with a new set of minimum and maximum timing intervals. The output signals of latches 102 and 103 also reinitialize error signal latch 105. After the minimum and maximum timing intervals have been programmed in timer 104 and the first timing signal is received from the microprocessor, lock circuit 102 once again prevents timer 104 from responding to any data input signals.

It is to be understood that the above-described lockable, programmable interval timer is merely an illustrative embodiment of the principles of this invention and that numerous other arrangements may be devised by those skilled in the art without departing from the spirit and scope of the invention. In particular, a programmable interval timer with only one time interval may be used with the lock circuit. In addition, the programmable interval timer may be used without the lock circuit allowing the maximum and minimum timing intervals to be reprogrammed each time, for example, a new software routine is called.

What is claimed is:

1. A programmable interval timer for generating an error signal when a timing signal is received outside a predetermined time frame, comprising:

timer means having minimum and maximum timing intervals determining said predetermined time frame and responsive to first and second data input signals for setting said minimum and maximum timing intervals, respectively, and further responsive to first and second timing signals for generating a first output signal when the time interval between said first and second timing signals is less than said minimum timing interval and a second output signal when the time interval between said first and second timing signals is greater than said maximum timing interval;

latch means for generating said error signal in response to one of said first and second output signals; and lock means connected to said timer means and responsive to a first receipt of one of said first and second timing signals for preventing said timer means from responding to one of said first and second data input signals.

2. The timer of claim 1 wherein said timer means comprises first counter means having said minimum timing interval and responsive to said first and second timing signals for generating said first output signal when the time interval between said first and second timing signals is less than said minimum timing interval and second counter means having said maximum timing interval and responsive to said first and second timing signals for generating said second output signal when the time interval between said first and second timing signals is greater than said maximum timing interval.

3. The timer of claim 1 wherein said timer means further comprises register means for storing said first and second input signals.

4. A lockable, programmable interval timer comprising:

programmable means having a minimum timing interval and responsive to a data input signal for setting said minimum timing interval and further responsive to first and second timing signals for generating an error signal when the time interval between said first and second timing signals is less than said minimum timing interval, and lock means when in a locked state for preventing said programmable means from responding to any data input signal, said lock means assuming said locked state in response to said first timing signal.

5. A lockable, programmable interval timer comprising:

programmable means having a maximum timing interval and responsive to a first data input signal for setting said maximum timing interval and further responsive to first and second timing signals for generating an error signal when the time interval between said first and second timing signals is greater than said maximum timing interval, and lock means when in a locked state for preventing said programmable means from responding to any data input signal, said lock means assuming said locked state in response to said first timing signal.

6. The timer of claim 5 wherein said programmable means also has a minmum timing interval and is responsive to a second data input signal for setting said minimum timing interval and is further responsive to said first and second timing signals for also generating said error signal when the time interval between said first and second timing signals is less said minimum timing interval.

7. The timer of claim 5 wherein said lock means has an unlocked state and is further responsive to a reset signal for assuming said unlocked state, said programmable means being responsive to said first and second data input signals when said lock means is in said unlocked state.

8. A lockable, programmable interval timer for generating an error signal when a timing signal is outside a predetermined time frame, comprising:

programmable means having minimum and maximum timing intervals determining said predetermined time frame and responsive to first and second data input signals for setting said minimum and maximum timing intervals, respectively, and further responsive to first and second timing signals for generating said error signal when at least one of said first and second timing signals is received outside of said predetermined time frame, and lock means connected to said programmable means and when in a locked state for preventing said programmable means from responding to any data input signal, said lock means assuming said locked state in response to a first receipt of one of said timing signals.

9. A lockable, programmable interval timer for generating an error signal when a timing signal is outside a predetermined time frame, comprising:

timer means having minimum and maximum timing intervals determining said predetermined time frame and responsive to first and second data input signals for setting said minimum and maximum timing intervals, respectively, and further responsive to first and second timing signals for generating a first output signal when the time interval between said first and second timing signals is less than said minimum timing interval and a second output signal when the time interval between said first and second timing signals is greater than said maximum timing interval;

latch means for generating said error signal in response to one of said first and second output signals; and lock means connected to said timer means and when in a locked state for preventing said timer means from responding to any data input signal, said lock means assuming said locked state in response to a first receipt of one of said timing signals.

10. The timer of claim 9 wherein said timer means comprises first counter means having said minimum timing interval and responsive to said first and second timing signals for generating said first output signal when the time interval between said first and second timing signals is less said minimum timing interval and second counter means having said maximum timing interval and responsive to said first and second timing signals for generating said second output signal when the time interval between said first and second timing signals is greater than said maximum timing interval.

11. The timer of claim 10 wherein said timer means further comprises register means for storing said first and second data signals.

12. The timer of claim 9 wherein said lock means has an unlocked state and is further responsive to a reset signal for assuming said unlocked state, said programmable means being responsive to said first and second data input signals when said lock means is in said unlocked state.

* * * * *

UNITED STATES PATENT AND TRADEMARK OFFICE
CERTIFICATE OF CORRECTION

PATENT NO. : 4,705,970
DATED : 11/10/87
INVENTOR(S) : George F. Turnpaugh

It is certified that error appears in the above-identified patent and that said Letters Patent is hereby corrected as shown below:

Column 3, line 23, "input 160", should be "input terminal 160"
Column 3, line 24, after "interval", insert --counter--.

Column 10, line 1, "less said", should be "less than said"
Column 10, line 53, "less said", should be "less than said"

Signed and Sealed this

Twenty-eighth Day of July, 1992

Attest:

DOUGLAS B. COMER

*Attesting Officer*  *Acting Commissioner of Patents and Trademarks*